United States Patent [19]

Beery

[11] Patent Number: 4,903,835
[45] Date of Patent: Feb. 27, 1990

[54] CARTRIDGE FOR WEB-TYPE MEDIA MATERIAL

[75] Inventor: Jack Beery, Centerville, Ohio

[73] Assignee: The Mead Corporation, Dayton, Ohio

[21] Appl. No.: 258,966

[22] Filed: Oct. 7, 1988

[51] Int. Cl.⁴ ............................................. B65D 85/38
[52] U.S. Cl. ................................. 206/416; 242/199
[58] Field of Search ............... 206/416, 413, 414, 415; 242/199, 71.8, 179

[56] References Cited

U.S. PATENT DOCUMENTS

| | | |
|---|---|---|
| 2,400,024 | 12/1944 | Roehrl . |
| 2,690,885 | 10/1954 | Crooks . |
| 3,442,474 | 5/1969 | Broos . |
| 3,737,028 | 6/1973 | Carlson ............................ 206/416 |
| 3,942,638 | 3/1976 | Stone ............................... 206/416 |
| 4,058,216 | 11/1977 | Tsuyuguchi ....................... 206/416 |
| 4,083,450 | 4/1978 | La Man ............................ 200/416 |
| 4,690,345 | 9/1987 | Cotey ............................... 206/416 |
| 4,715,558 | 12/1987 | Fair et al. . |

FOREIGN PATENT DOCUMENTS 546634 3/1956 Belgium .
1147841 4/1963 Fed. Rep. of Germany .

Primary Examiner—Joseph Man-Fu Moy
Attorney, Agent, or Firm—Biebel, French & Nauman

[57] ABSTRACT

A cartridge or cassette for light and pressure sensitive web-type media material includes a generally rectangular housing board received between a pair of identical housing ends, to retain a spool of such media material therein. The housing is formed with an exit opening in a front wall defined by an inwardly-extending flap parallel to the top forming a light-trap passage. Media material from the spool is guided through the light-trap passage with the outer pressure sensitive surface in non-contacting relation to the housing. The spool is formed with a central core which has an outer cylindrical surface free of discontinuities or irregularities. A pair of end flanges are received on the core having radial surfaces in close relation to the convolutions of the web. The housing ends are formed with annular inwardly-extending rings which terminate in close running relation to the adjacent outside surface of a spool end flange to support the media material and to prevent telescoping in the event the cartridge or cassette is mishandled or dropped.

4 Claims, 4 Drawing Sheets

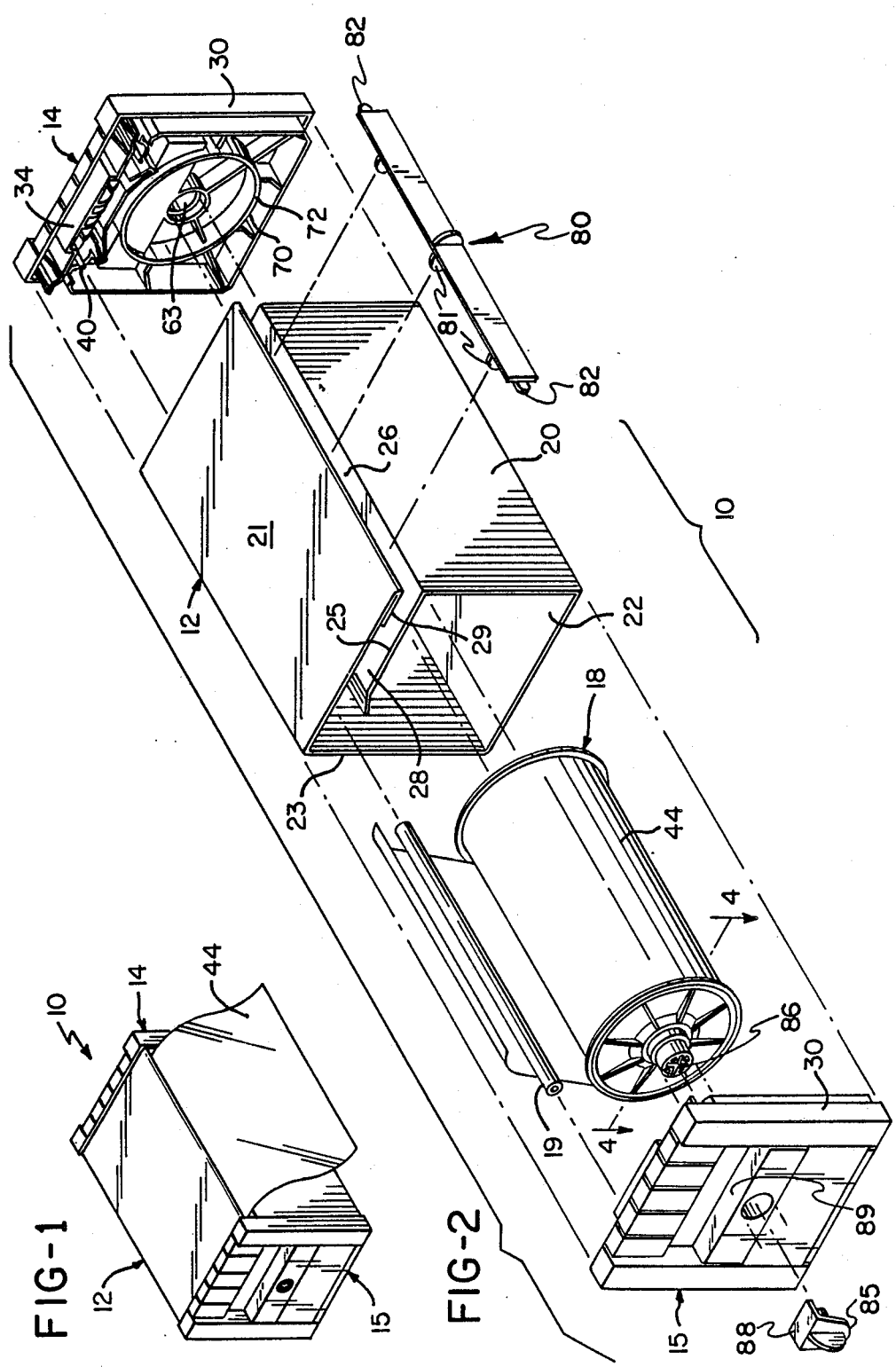

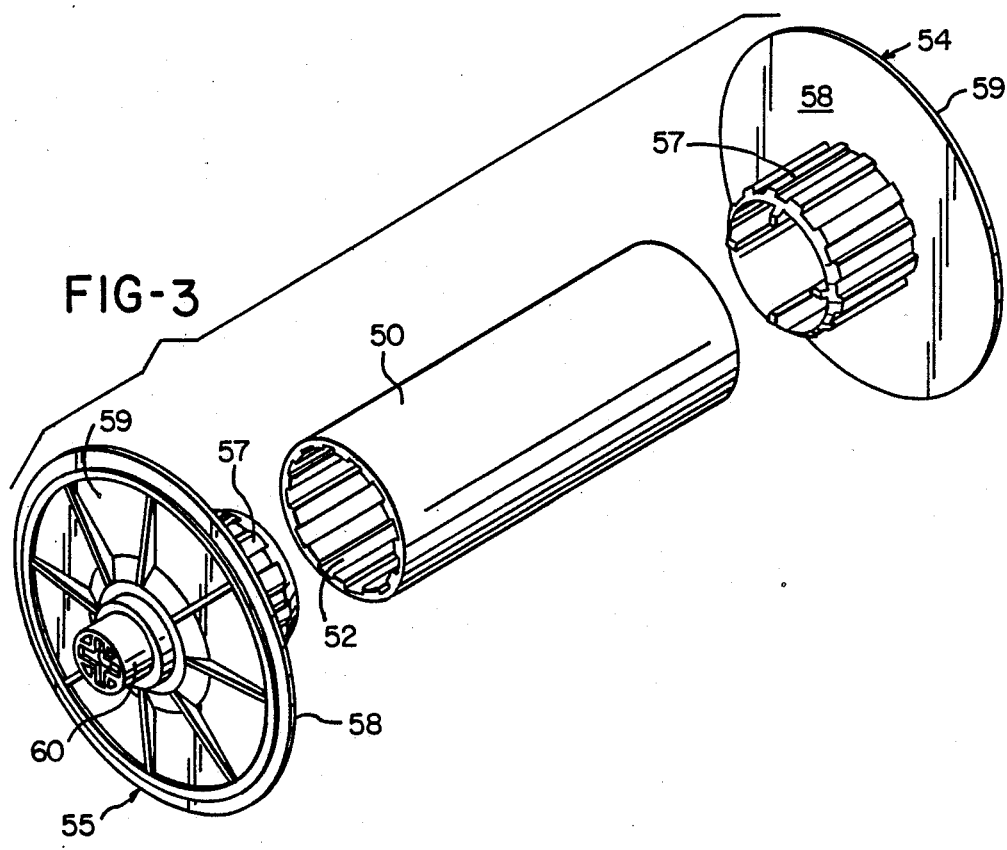
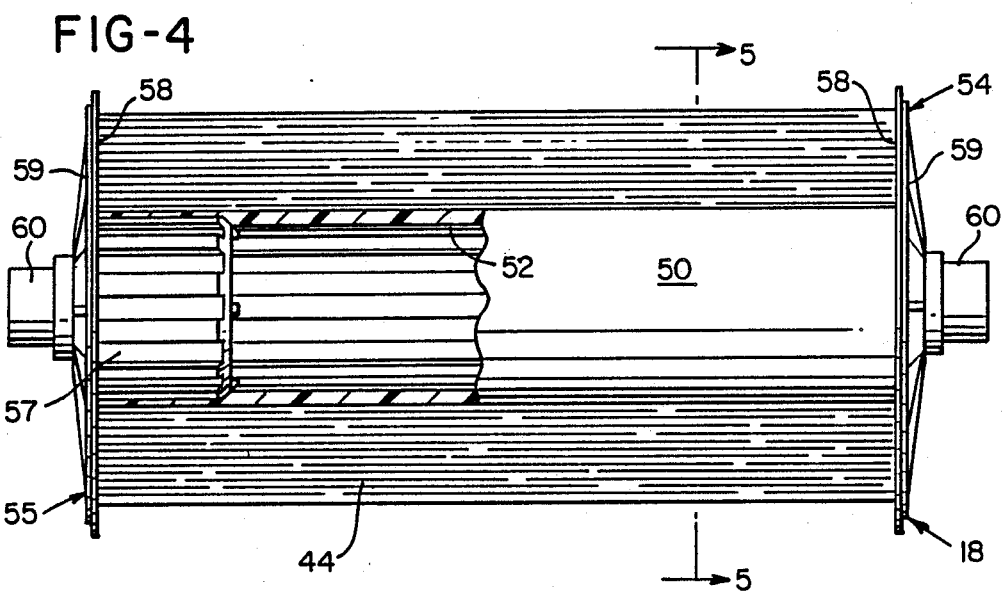

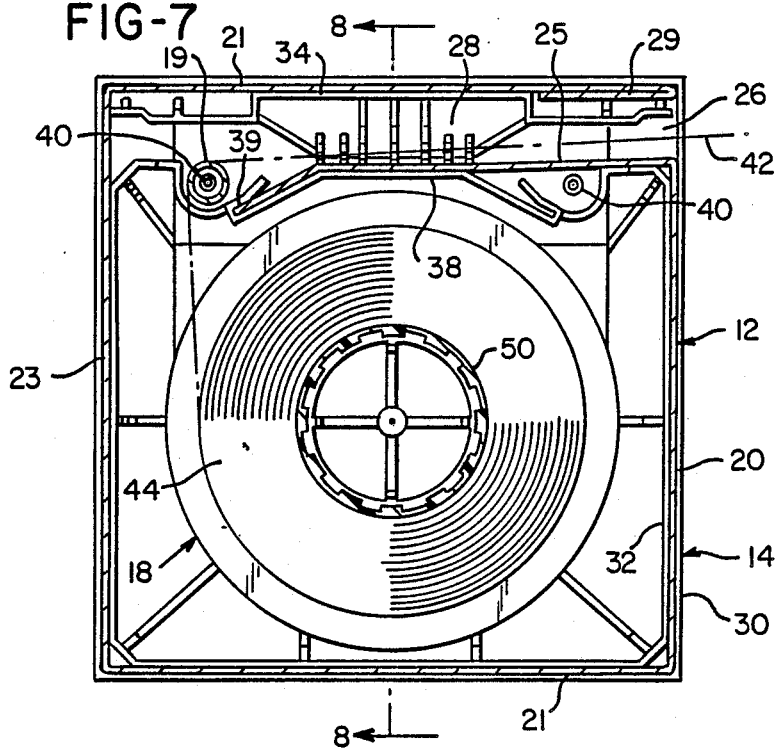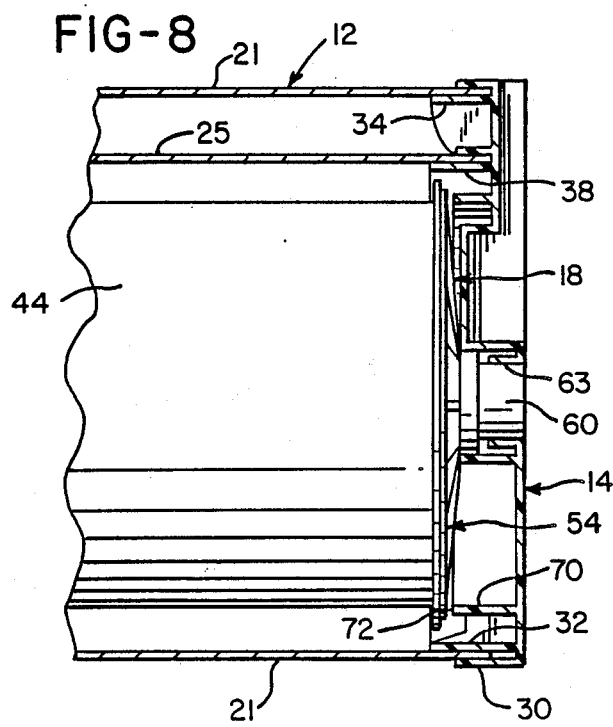

CARTRIDGE FOR WEB-TYPE MEDIA MATERIAL

BACKGROUND OF THE INVENTION

This invention relates to cartridges and cassettes for containing and storing web-type media material, and more particularly to such a storage container for material which is light and pressure sensitive, and which is normally wound in tension on a container spool.

The invention is particularly adapted for the protection of donor web material containing microencapsulated image-forming chromogenic material, such as made in accordance with the teachings of U.S. Pat. Nos. 4,440,846 and 4,399,209, assigned to the same assignee as this invention. In the above-identified U.S. patents, an imaging system includes a photosensitive layer comprising microcapsules containing a photosensitive composition in the internal phase. This composition is both light and pressure sensitive. It is intended to be imagewise exposed to actinic radiation and thereafter subjected to a uniform rupturing force in which the microcapsules are selectively ruptured and release the internal phase. The microcapsules of the donor sheets are applied to a substrate layer, and form a web of material for use in suitable utilization apparatus. The cartridges of this invention contain such material in spooled form permitting the delivery, handling and insertion of the media material into utilization apparatus.

The web-type donor material is sensitive to locally applied pressure, such as may occur when a web of such material is wound in tension on a spool or core in which there exists a surface discontinuity, in the form of a splice, a joint, or even a piece of tape. Such a discontinuity will result in the damage to a plurality of the immediately adjacent convolutions of the media material.

SUMMARY OF THE INVENTION

The invention is directed to cartridges for the retention of web type media material having a light and pressure sensitive surface as defined above. The term "cartridge" is used herein to include both single spool and multiple spool light-tight containers, the latter often referred to as a cassette.

The cartridge is characterized by a spool construction in which a core is formed with a cylindrical smooth outer surface at all locations which are in contact with the media material. The outer surface of the core is free of any irregularities. The core is formed, at opposite open ends, with connector or drive means in the form of spines. Preferably, the core is formed by extrusion, with an internal spline extending axially therethrough.

The spool further includes a pair of end flanges which are separate and removable from the core. Each end flange is formed with an axial extension which forms a close fit with an end of the core, and has a smooth wall which extends radially from the adjacent outer surface of the core, when the end flanges are assembled on the core. The axial extension of the end flanges may be formed with an external spline on the outer surface thereof proportioned to form a close sliding fit with the internal spline formed on the core. When assembled, the end flanges do not exert any expansive force on the core as would cause the core to be distorted at the surface.

The internal spline of the core permits the web to be wound thereon on spindle winding machines. Thereafter, the end flanges may be added by inserting the axial extensions into the core ends. The radial flanges are immediately adjacent the wound convolutions, to protect the material. Also, the internal spline of the core permits the core to be used to transmit winding torque, as may be desired, to adjacent core sections on a winder.

It is accordingly an object of the invention to provide a cartridge in which a spool is formed or provided with a core with a smooth cylindrical outer surface free of discontinuities, and having removable end flanges.

Another object of the invention is the provision of a spool for a cartridge including a smooth integral core having an integral spline, and a pair of identical end flanges with externally splined axial extensions removably received in the opposite ends of the core, and present to the core radially smooth wall surfaces immediately adjacent the web convolutions. The spool thus formed is adapted to receive thereon web type media material having microencapsulated liquid in an integral phase, which may be wound in tension without damage to the material due to pressure anomalies.

These and other objects and advantages of the invention will be apparent from the following description, the accompanying drawings and the appended claims.

BRIEF DESCRIPTION OF ACCOMPANYING DRAWINGS

FIG. 1 is a perspective view of a cartridge made in accordance with this invention;

FIG. 2 is an exploded view of the cartridge of FIG. 1;

FIG. 3 is an exploded view of the spool of the cartridge of FIGS. 1 and 2;

FIG. 4 is a side elevation, partially in section, of the spool with the web type media material wound thereon, and the sectioned portion looking generally along the line 4—4 of FIG. 2;

FIG. 7 is an elevational view of the inside of one of the end caps, showing the location of one of the guide rolls and the path of the web therethrough and with the housing board shown in section; and FIG. 8 is a partial section through the cartridge, with the spool and web thereon in elevation, looking generally along the line 8—8 of FIG. 7.

DESCRIPTION OF PREFERRED EMBODIMENT

Figure 5:
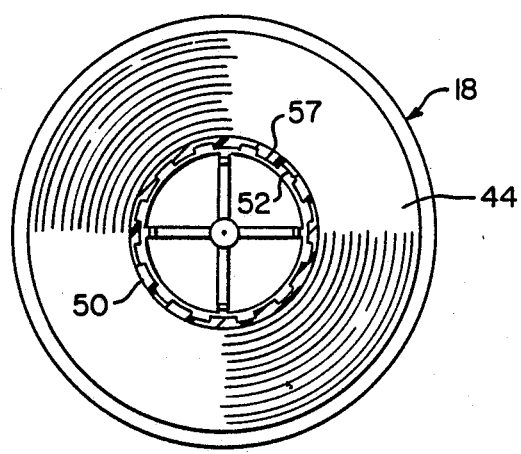
FIG. 5 is a transverse section through the spool looking generally along the line 5—5 of FIG. 4.

Description of preferred embodiment, referring to the figures of the drawing, which illustrate a preferred embodiment of this invention, a cartridge constructed according to this invention as illustrated at 10 in FIGS. 1 and 2.

As illustrated in FIG. 2, the cartridge of this invention is made up of five principal parts: a central housing 12, which is sometimes referred to as a housing board, a pair of identical cartridge ends or end caps 14 and 15, which receive and are fitted on the opposite edges of the housing 12, a central spool 18, and a web guide roller 19. The end caps may be injection molded of plastic material. The housing 12 is formed preferably of paperboard material which is painted or coated to have a black, low reflectance surface, and is folded generally in the form of a square tube with a front wall 20, a top 21, a bottom 22 and a back wall 23.

The front wall 20 is formed with an inwardly directed flap 25 which is positioned in generally parallel and spaced relation to a top wall 20 to define a media exiting slot 26 positioned transversely along an upper edge of the housing 12. The slot 26 leads into an internal light trapping passage 28, which passage terminates in spaced relation to the back wall 23. The passage 28 is defined by the inside surface of the top 21 and the opposed outside parallel surface of the flap 25. A leading edge of the top 21 at the slot 26 may be folded back at 29 to form a smooth edge for the slot.

As previously noted, the end caps 14 and 15 may be identical in construction, and are configured to receive the board of the housing 12 at the edges, and to hold the housing board in place. For this purpose, each of the end caps is formed with an outside, generally axially-extending flange 30 which forms a close fit with the outer surfaces of the respective top, bottom, and sides of the housing 12, when the end cap is assembled over the housing board, as shown in FIGS. 7 and 8. In such assembled condition, as may be seen in FIG. 7, a generally U-shaped inside wall 32 also extends axially of the end wall 14 or 15 in spaced relation to the outside flange 30 and receives the terminal edge of the front housing wall 20, the bottom 21, and the rear wall 23 therebetween.

A top flange portion 34, extends transversely across the top of the respective end walls and is positioned to receive the top 21 between it and the peripheral flange 30 at the top. The top flange 34 terminates in spaced relation to the flange 32 at the front wall to define the media slot 26. The flap 25 which defines the lower surface of the light trapping passage 28 is received on a ledge 38, with the inner most end thereof received within a channel portion 39 of the ledge.

The media guide roller 19 is piloted on one of a pair of locating pins 40 formed in the end caps 14 and 15. While the roller 19 may be formed of plastic material, it is preferred to form the roller as a section of rolled metal tubing for greater resistance to bending. While a pair of such locating pins 40 are formed on each of the end caps, only one pin is used, to permit the end caps to be reversed one to the other. The roller 19 provides guide means to define the path 42 of the web type media material 44 from the spool 18, and to assure that the material is guided from the spool into the passage 28 and through the slot 26, with its outer pressure sensitive surface in non-contacting relation to the walls of the housing 12 and to the walls of the passage 28.

The spool 18 of this invention is particularly constructed as to prevent marking of the web type media material. The spool includes a cylindrical core 50. The core 50 is preferably extruded from plastic material and defines a smooth outer surface free of any joint or discontinuity. At least the opposite open ends of the core 50 are formed with means defining an internal spline 52. Preferably, the spline 52 extends the full axial length of the core 50.

The spool 18 further includes a pair of identical end members or end flanges 54 and 55. The end flanges may be formed of plastic material, and each is provided with an externally splined axial extension 57 proportioned to be received in one of the ends of the core 50. The extension 57 forms a close fit with the internal spline 52 of the core.

Each of the end flanges further has an annular flange 58 forming generally radially extending inside walls 59. When the end flanges are assembled on the core 50, the walls 59 extend generally radially from the outer cylindrical surface of the core 50, as shown in FIG. 4. In such assembled conditions, the terminal ends of the core 50 abut the radial wall surface 58 of an end flange.

The end flanges are further provided with axially outwardly extending pinion or spindle 60, by means of which the assembled spool 18 may be rotatably mounted in and between the cartridge end wall 14 and 15. For this purpose, the end walls are each formed with a spindle-receiving opening 63, as shown in FIG. 2, through which the spool spindle ends or spindles 60 extend in the assembled condition.

The web type media material 44 is wound on the core 50, on spindle winding apparatus, prior to the assembly of the end flanges 54 and 55 onto the core 50. The media material is formed with a width which substantially coincides with the width of the core. Preferably, the core is formed with an overall length, which is less than exceeds the width of the media material, by approximately 0.005" to 0.015" at each end, thereby permitting the surfaces 58 to form a close or zero tolerance fit against the convoluted edges of the media convolutions, as shown in FIG. 4, when the end flanges are fully seated on the core 50, as shown.

Figure 6:
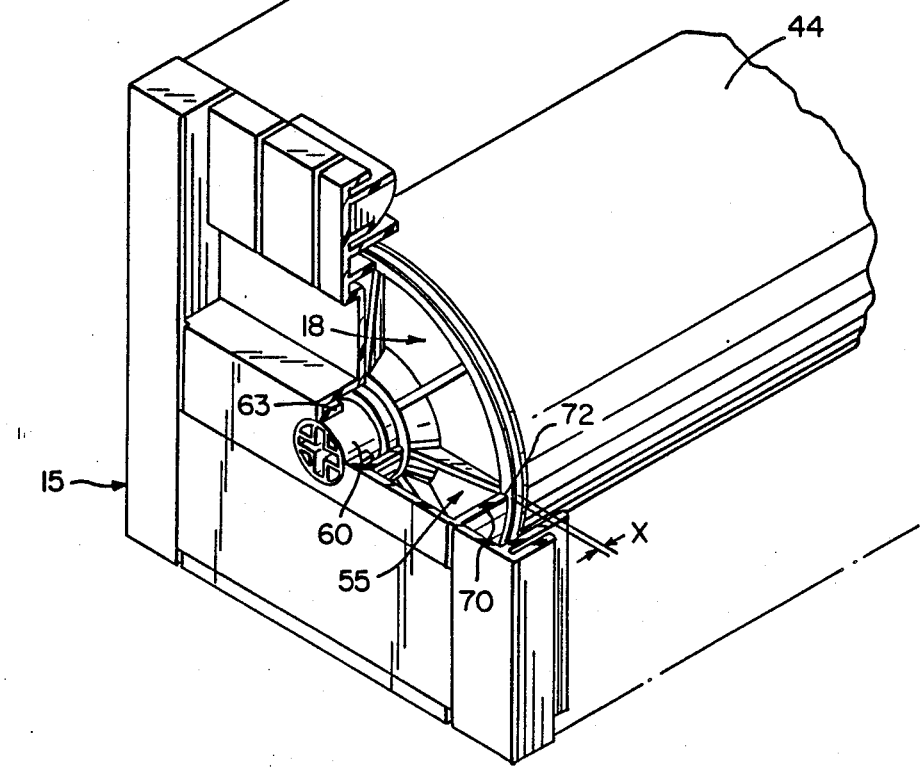
FIG. 6 is a partially broken away end view of one of the end caps of the cartridge showing the spool therein.

The end caps 14 and 15 further include means for locating the spool therein and for preventing telescoping of the web type media material 44 in the event that the cartridge is subjected to a suddenly applied axial acceleration, such as may occur when the cartridge is dropped. For this purpose, each of the end caps 14, 15 is formed with an axially extending retainer in the form of a ring 70. The ring 70 terminates at an inner surface or edge 72 in close proximity to the spool 18 at an outside surface of the adjacent end flange 54 or 55. As shown in FIG. 6, a minimum spacing as defined by the reference "X" is formed between the terminal or inner end of the axially extend inner end 72 of the axially extending ring 70 and the adjacent outside surface of the end flange 14 or 15. The distance "X" may be in the order of as low as 0.010" up to about 0.030" to allow for free rotation of the spool spindles 60.

The axially extending ring 70 is positioned, with respect to the spool 18, to receiving axial loads applied by the spool in the event that the cartridge 10 is dropped on one of the end caps. Since the space "X" is small, the end flange cannot be substantially displaced from its seated position as to permit stepping or telescoping of the web convolutions. Even if the spool is displaced by a maximum amount as permitted by !he tolerances, the spool and end flanges will move as a body until input is absorbed by the ring 70. The same relationship of the surface 72 of the anti-telescoping ring 70 exists with respect to each of the end caps 14 and 15, and each of the respective end flanges 54 and 55.

The operation of the invention is largely self evident from the forgoing description. The web type media material is wound on the cores 50 on spindle winding equipment, preferably with the end flanges removed. Preferably, the material 44 is wound so that the tension remains constant. During winding, the internal spline 52 may be used to locate and drive the core 50 on the spindle winding equipment.

Thereafter, the core with wound media material is removed from the winder and the end flanges 54 and 55 assembled, by the insertion of the externally splined axial extensions 57 into the interior splines 52 of the core 50. The full axial length of the core 50 is cylindrical and free of any protuberances, or discontinuities, and the axial extensions 57 of the end flanges, while providing a close fit, do not exert any excessive radial forces on the core 50 as would distort the core and damage the web type media material.

The housing 12 is preferably prescored and precreased or folded at the corners so that it can be formed about the loaded spool 18, with the edges glued in place on and between the flanges 30, 32 and 34 of the end cap. The inwardly extending flap 25 is received within the channel 39 of the ledge 38 and suitably secured thereto by an adhesive. The guide roller 19 is preassembled between the end caps prior to the wrapping of the housing thereabout. In the assembled condition, the anti-telescoping rings 70 provide an axial abutment at either end of the spool 18, at the adjacent outer surfaces of the end caps, to support the spool against accelerations which could cause telescoping or stepping of the material.

During shipment and storage of the cartridge 10, the media material is further protected by an angulated slot closure plate 80 (FIG. 2) which may be inserted with semicircular projections 81 received in the slot 26 and the opposite end tabs 82 inserted behind the side flange 30. The projections also help to prevent crushing of the housing at the slot 26 by weight or loads applied to the housing, by adding strength to the housing at the slot. Rotation of the spool 18 may be prevented by an end lock or keeper 85 which engages cruciform shaped slots 86 in the spool end flanges, at the hub portion thereof. The lock has a flat ledge portion or top 88 which rests on a flat surface 89 formed on the outer side of the cartridge ends 14 and 15. The lock 85 prevents unwanted unwinding of the spool 18 prior to utilization. The flat surface 89 conveniently forms part of a hand grip recess formed in the outer surface of each of the end caps.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a cartridge containing a spool of light and pressure sensitive media material, the improvement in spool construction comprising a cylindrical core having a smooth outer surface free of irregularities and discontinuities, and having open ends, a pair of identical spool end flanges, each of said end flanges having an axially-extending portion adapted to be received in one core end and forming a close fit therewith and further having an annular wall, which wall extends radially of said core at the side thereof facing said core, interfitting torque transmitting means on said axially-extending end flange portions and in said core open ends forming a torque transmitting connection between said core and said end flanges, said end flanges proportioned to be insertable onto said core after said media is wound thereon to engage said interfitting torque transmitting means without introducing a radial stress into said core.

2. The cartridge of claim 1 in which the length of said core does not exceed the width of said web-type media material so that the end convolutions of said material wound on said core are in abutment with said annular walls of said end flanges.

3. In a cartridge for containing a spool of light and pressure sensitive media material, the improvement in spool construction comprising:
a core formed of extruded plastic material and having a cylindrical smooth outer surface free of joints and discontinuities,
an integral spline formed at least in the opposite ends of said core,
a pair of end members formed of plastic material, each end member having an externally splined axial extension proportioned to be removably received in an end of said core in close interfitting relation to said internal spline and further having a wall extending radially from the adjacent outer cylindrical surface of said core, said splined axial extensions and said internal spline adapted to transmit torque between said end members and said core without transmitting a radial stress on said core.

4. The cartridge of claim 3 in which said end members are removable from said core to permit said media to be wound thereon in automatic spindle winding apparatus.

* * * * *